United States Patent [19]

Schwendeman

[11] Patent Number: 5,440,299

[45] Date of Patent: Aug. 8, 1995

[54] METHOD AND APPARATUS FOR EQUALIZING BATTERY LIFE IN A SELECTIVE CALL COMMUNICATION SYSTEM

[75] Inventor: Robert J. Schwendeman, Pompano Beach, Fla.

[73] Assignee: Motorola, Inc., Schaumburg, Ill.

[21] Appl. No.: 130,573

[22] Filed: Oct. 1, 1993

[51] Int. Cl.⁶ .............................................. G08B 5/22
[52] U.S. Cl. .......................... 340/825.51; 340/825.44; 340/825.47; 455/38.3; 455/343
[58] Field of Search ....................... 340/825.44, 825.47, 340/825.50, 825.51; 455/38.3, 343

[56] References Cited

U.S. PATENT DOCUMENTS

| | | | |
|---|---|---|---|
| 4,232,294 | 11/1980 | Burke et al. | 340/825.5 |
| 4,419,765 | 12/1983 | Wycoff | 455/36 |
| 4,449,248 | 5/1984 | Leslie et al. | 455/343 |
| 4,628,311 | 12/1986 | Milling | 340/825.5 |
| 4,668,949 | 5/1987 | Akahori et al. | 340/825.47 |
| 4,845,491 | 7/1989 | Fascenda | 340/825.44 |
| 4,857,915 | 8/1989 | Andros et al. | 340/825.44 |
| 4,996,526 | 2/1991 | DeLuca | 340/825.44 |

Primary Examiner—Michael Horabik
Attorney, Agent, or Firm—R. Louis Breeden

[57] ABSTRACT

A method and apparatus equalizes battery life among a plurality of battery-powered selective call receivers (110) in a communication system (100). The communication system (100) utilizes periodic transmissions of queuing groups (222, 224, 226, 228) of selective call addresses queued into the queuing groups (222, 224, 226, 228) for battery saving, and further queued into transmission positions (230) having a predetermined queuing order within the queuing groups (222, 224, 226, 228) for additional battery saving. The predetermined queuing order is periodically rotated (504, 512) such that each of the selective call addresses experiences a queuing delay between an initiation of a transmission of a queuing group and a transmission of the selective call address queued in the queuing group, whereby the queuing delay averaged over a plurality of queuing group transmissions approaches a single, constant value substantially applicable to each of the selective call addresses.

15 Claims, 5 Drawing Sheets

METHOD AND APPARATUS FOR EQUALIZING BATTERY LIFE IN A SELECTIVE CALL COMMUNICATION SYSTEM

FIELD OF THE INVENTION

This invention relates in general to selective call radio communication systems, and more specifically to a method and apparatus for equalizing battery life among receivers in a selective call communication system.

BACKGROUND OF THE INVENTION

Selective call communication systems that utilize battery saving techniques for extending battery life in selective call receivers operating therein are well known in the communications art. One such technique requires a system to queue pages in a plurality of queuing groups assigned to receivers in a predetermined manner for transmission at predetermined times. A selective call receiver operating on the system synchronizes with the transmissions from the system in a manner that allows the receiver to remain in a low-power stand-by mode until a predetermined transmission time assigned for the receiver's queuing group is imminent. Then the receiver briefly switches to a high-power receive mode to monitor the transmission of the assigned queuing group to determine whether there are any messages addressed to the receiver, after which the receiver returns to the low-power mode to conserve battery power.

A well-known improvement to the technique of grouping transmissions for battery saving comprises transmitting each queuing group of selective call addresses in a predetermined order, e.g., ascending order. This technique can allow the receivers, on average, to return to the low-power mode substantially halfway through the transmission of the queuing group. This is because each of the receivers can return to the low-power mode as soon as the receiver decodes an address higher than its own address without having received its own address.

Unfortunately, transmitting each group of selective call addresses in a predetermined order does not treat all receivers equally. A receiver having a low address near the start of the predetermined transmission order for the group consistently will be able to return to the low-power mode shortly after the start of the transmission of the queuing group. A receiver having a high address near the end of the predetermined transmission order for the group consistently will have to remain in the high-power mode for most or all of the transmission of the queuing group.

As a result of the address-dependent variable duration of the high-power mode, there is an imbalance in the effective amount of battery saving experienced, the low-address pager benefiting greatly from the ordering technique described above, while the high-addressed pager benefits little or not at all. This imbalance manifests itself in an imbalance in battery life, the low-addressed pager within the queuing group exhibiting a longer battery life than the high-addressed pager within the queuing group. In an idealized system all receivers would exhibit substantially equal battery life.

Thus, what is needed is a method and apparatus for equalizing battery life among battery-powered selective call receivers in a communication system utilizing periodic transmissions of queuing groups of selective call addresses queued into the queuing groups for battery saving, and further queued into transmission positions having a predetermined queuing order within the queuing groups. The method and apparatus preferably should achieve battery saving benefits comparable to those that would be achieved by consistently returning every receiver to the low-power mode substantially halfway through the transmission of the queuing group to which the receiver belongs.

An aspect of the present invention is a method of equalizing battery life among a plurality of battery-powered selective call receivers in a communication system utilizing periodic transmissions of selective call addresses queued into queuing groups for battery saving, and further queued into transmission positions having a predetermined queuing order within the queuing groups for additional battery saving. The method comprises the step of periodically changing, in a system controller, the predetermined queuing order. The changing step comprises the steps of queuing a first plurality of selective call addresses into a first plurality of queuing groups for a first transmission, wherein the first plurality of selective call addresses are queued in a first predetermined queuing order; and queuing a second plurality of selective call addresses into a second plurality of queuing groups for a second transmission, wherein the second plurality of selective call addresses are queued in a second predetermined queuing order substantially equal to the first predetermined queuing order in reverse. The changing step further comprises the step of alternately transmitting to the plurality of battery-powered selective call receivers the first plurality of queuing groups and a first queuing order indicator for identifying the first predetermined queuing order, followed by the second plurality of queuing groups and a second queuing order indicator for identifying the second predetermined queuing order. At least one of the plurality of battery-powered selective call receivers is pre-programmed with an individual selective call address comprising a queuing group indicator for indicating membership in a particular queuing group, and further is pre-programmed with information defining predetermined queuing orders utilized by the communication system. The method further comprises in a receiver of the at least one of the plurality of battery-powered selective call receivers the steps of receiving a queuing order indicator for indicating one of the predetermined queuing orders utilized for a corresponding transmission of a queuing group, and detecting that the initiation of a transmission of the particular queuing group matching the queuing group indicator pre-programmed into the receiver is imminent. The method also includes the step of controlling reception and decoding of the selective call addresses transmitted in the particular queuing group for a specific duration in response to the detecting step, wherein the specific duration is determined by examination of ones of the selective call addresses in accordance with the received queuing order indicator.

Another aspect of the present invention is an apparatus for equalizing battery life among a plurality of battery-powered selective call receivers in a communication system having a system controller utilizing periodic transmissions of selective call addresses queued into queuing groups for battery saving, and further queued into transmission positions having a predetermined queuing order within the queuing groups for additional battery saving. The apparatus comprises a rotation element in the system controller for periodically changing the predetermined queuing order. The rotation element comprises a first queuing element for queuing a first plurality of selective call addresses into a first plurality of queuing groups for a first transmission, wherein the first plurality of selective call addresses are queued in a first predetermined queuing order; and a second queuing element coupled to the first queuing element for queuing a second plurality of selective call addresses into a second plurality of queuing groups for a second transmission, wherein the second plurality of selective call addresses are queued in a second predetermined queuing order substantially equal to the first predetermined queuing order in reverse. The apparatus further comprises a transmitter coupled to the first and second queuing elements for alternately transmitting to the plurality of battery-powered selective call receivers the first plurality of queuing groups and a first queuing order indicator for identifying the first predetermined queuing order, followed by the second plurality of queuing groups and a second queuing order indicator for identifying the second predetermined queuing order. At least one of the plurality of battery-powered selective call receivers is pre-programmed with an individual selective call address comprising a queuing group indicator for indicating membership in a particular queuing group, and further is pre-programmed with information defining predetermined queuing orders utilized by the communication system. The apparatus further comprises in the at least one of the plurality of battery-powered selective call receivers a receiver element coupled by radio to the transmitter for receiving a queuing order indicator for indicating the predetermined queuing order utilized for a corresponding transmission of a queuing group, and a detector element coupled to the receiver element for detecting that the initiation of a transmission of the particular queuing group matching the queuing group indicator pre-programmed into the battery-powered selective call receiver is imminent. The apparatus further comprises in the at least one of the plurality of battery-powered selective call receivers a controller coupled to the detector element and to the receiver element for controlling reception and decoding of the selective call addresses transmitted in the particular queuing group for a specific duration in response to the initiation of the transmission being imminent, wherein the specific duration is determined by examination of ones of the selective call addresses in accordance with the received queuing order indicator.

Another aspect of the present invention is a system controller for equalizing battery life among a plurality of battery-powered selective call receivers in a communication system including a transmitter and utilizing periodic transmissions of selective call addresses queued into queuing groups for battery saving, and further queued into transmission positions having a predetermined queuing order within the queuing groups for additional battery saving. The system controller comprises a page input for receiving page requests from callers wishing to page one of the plurality of battery-powered selective call receivers, and a memory element coupled to the page input for storing the received page requests for subsequent transmission. The system controller further comprises a rotation element for periodically changing the predetermined queuing order. The rotation element comprises a first queuing element for queuing a first plurality of selective call addresses into a first plurality of queuing groups for a first transmission, wherein the first plurality of selective call addresses are queued in a first predetermined queuing order; and a second queuing element coupled to the first queuing element for queuing a second plurality of selective call addresses into a second plurality of queuing groups for a second transmission, wherein the second plurality of selective call addresses are queued in a second predetermined queuing order substantially equal to the first predetermined queuing order in reverse. The system controller further comprises an encoder/transmitter controller coupled to the first and second queuing elements and to the transmitter for controlling the transmitter to alternately transmit to the plurality of battery-powered selective call receivers the first plurality of queuing groups and a first queuing order indicator for identifying the first predetermined queuing order, followed by the second plurality of queuing groups and a second queuing order indicator for identifying the second predetermined queuing order.

Yet another aspect of the present invention is a battery-powered selective call receiver for equalizing battery life among a plurality of the battery-powered selective call receivers in a communication system utilizing periodic transmissions of selective call addresses from a transmitter, the selective call addresses queued into queuing groups for battery saving, and further queued into transmission positions having a predetermined queuing order within the queuing groups for additional battery saving. The battery-powered selective call receiver comprises a first memory element having pre-programmed therein an individual selective call address for identifying the battery-powered selective call receiver, and a queuing group indicator for indicating membership in a particular queuing group. The battery-powered selective call receiver further comprises a second memory element coupled to the first memory element and pre-programmed with information defining predetermined queuing orders utilized by the communication system, and a receiver element coupled to the transmitter for receiving a queuing order indicator for indicating the predetermined queuing order utilized for a corresponding transmission of a queuing group. The battery-powered selective call receiver also includes a detector element coupled to the receiver element and to the first memory element for detecting that the initiation of a transmission of a particular queuing group matching the queuing group indicator pre-programmed into the first memory element is imminent; and a controller coupled to the detector element and to the receiver element for controlling reception and decoding of the selective call addresses transmitted in the particular queuing group for a specific duration in response to the initiation of the transmission being imminent. The specific duration is determined by examination of ones of the selective call addresses in accordance with the received queuing order indicator.

Still another aspect of the present invention is a system controller for equalizing battery life among a plurality of battery-powered selective call receivers in a communication system including a transmitter and utilizing periodic transmissions of selective call addresses queued into queuing groups for battery saving, and further queued into transmission positions having a predetermined queuing order within the queuing groups for additional battery saving. The system controller comprises a page input for receiving page requests from callers wishing to page one of the plurality of battery-powered selective call receivers, and a memory element coupled to the page input for storing the received page requests for subsequent transmission. The system controller further comprises a rotation element for periodically changing the predetermined queuing order such that each of the selective call addresses experiences a queuing delay between an initiation of a transmission of a queuing group and a transmission of the selective call address queued in the queuing group. The queuing delay averaged over a plurality of queuing group transmissions approaches a single, constant value substantially applicable to each of the selective call addresses. The rotation element comprises a starter element for designating a rotating starting point for the predetermined queuing order, from which the selective call addresses are queued in a predetermined order until all the selective call addresses have been queued.

DESCRIPTION OF THE PREFERRED EMBODIMENT

Figure 1:
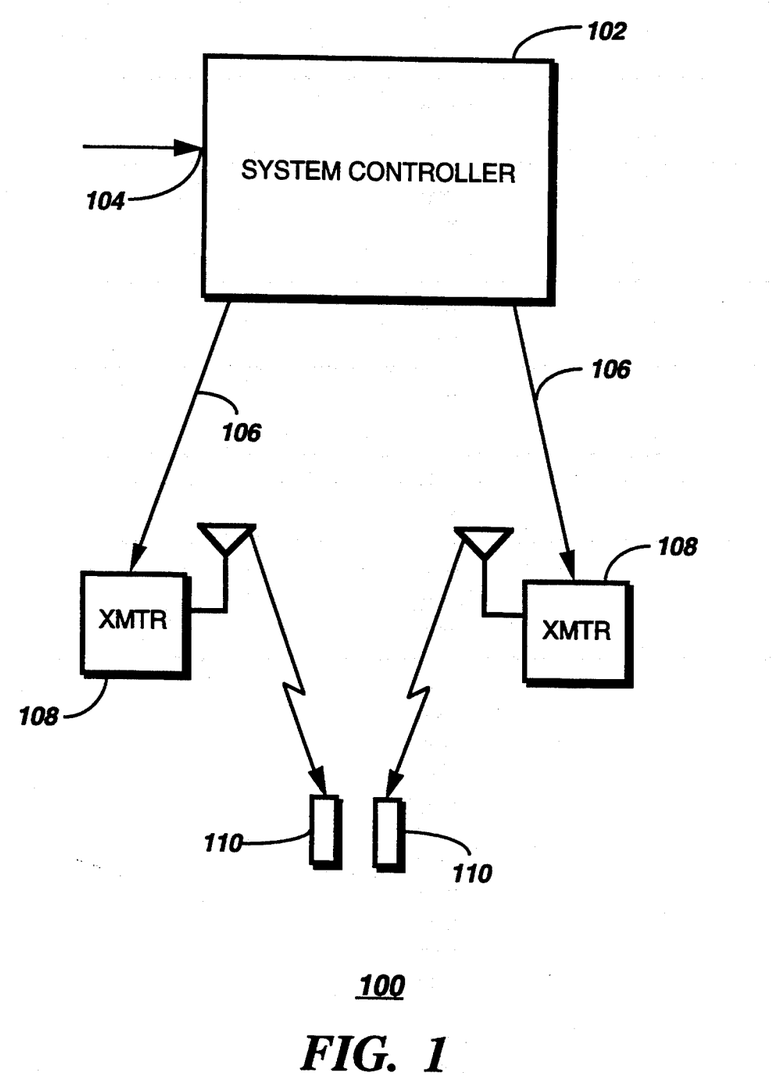
FIG. 1 is an electrical block diagram of a communication system in accordance with the preferred embodiment of the present invention.

Referring to FIG. 1, a system block diagram of a communication system 100 in accordance with the preferred embodiment of the present invention comprises a system controller 102 for formatting and queuing selective call messages and controlling the transmission thereof. The system controller 102 comprises a page input 104 for receiving calls directed to individual selective call receiver addresses in a manner well known in the art. The system controller 102 is coupled by at least one telephone line 106 to at least one transmitter 108 for transmitting the selective call messages by radio communications to at least one battery-powered selective call receiver 110. Preferably, the system controller 102 is similar to a model E09PED0552 PageBridge ® paging terminal, the paging transmitter is similar to a model C73 PURC 5000 ® transmitter, and the battery-powered selective call receiver 110 is similar to a model A03KLB5962CA ADVISOR ® pager, all manufactured by Motorola, Inc. of Schaumburg, Ill. It will be appreciated that other similar equipment may be used as well to construct the communication system 100. During operation, the system controller 102 receives and queues page requests from callers desiring to send messages to ones of the selective call receivers 110. Periodically, e.g., every few minutes, the system controller 102 controls the transmitters 108 to transmit the queued pages to the selective call receivers 110. To conserve battery power in the selective call receivers 110 the system controller 102 queues the pages into groups for transmission at predetermined times and further queues the pages in a predetermined, rotating order in accordance with the preferred embodiment of the present invention, as described herein below.

Figure 2:
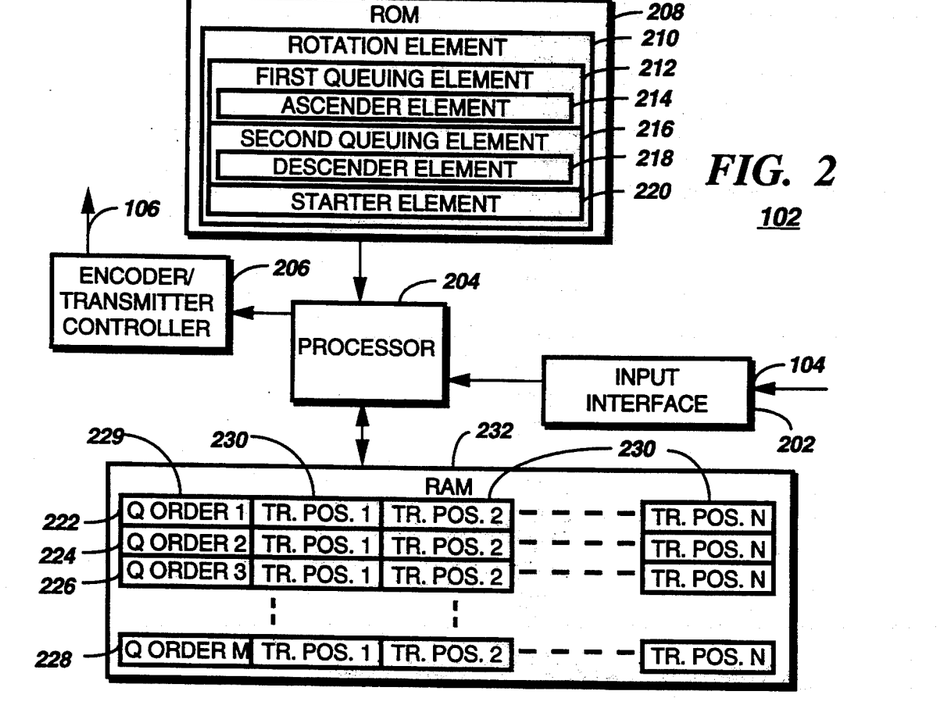
FIG. 2 is an electrical block diagram of a system controller in accordance with the preferred embodiment of the present invention.

Referring to FIG. 2, an electrical block diagram of the system controller 102 in accordance with the preferred embodiment of the present invention comprises an input interface 202 for accepting page requests from the page input 104. The system controller 102 further comprises a processor 204 coupled to the input interface for processing the accepted page requests and queuing selective call addresses corresponding thereto. The processor 204 is coupled to a random access memory (RAM) 232 for storing queuing groups 222, 224, 226, 228, comprising transmission positions 230 for queuing the selective call addresses in a predetermined queuing order, and a queuing order indicator 229 for identifying the predetermined queuing order utilized for each of the queuing groups 222, 224, 226, 228. Preferably, the queuing order indicator 229 is transmitted with each of the queuing groups 222, 224, 226, 228 for identifying the queuing order of the accompanying queuing group 222, 224, 226, 228.

It will be appreciated that, in the alternative, a single queuing order indicator 229 can be queued and transmitted for identifying the predetermined queuing order utilized for a plurality of the queuing groups 222, 224, 226, 228. The single queuing order indicator 229 could, for example, be transmitted at the beginning of a batch of pages for identifying the queuing order utilized for all the queuing groups 222, 224, 226, 228 in the batch. Then the queuing order could be periodically rotated during subsequent batches. It will be further appreciated that the queuing order indicator can be implicitly determined from another aspect of the batch, e.g., a group or frame number or some portion thereof, such as the most significant bit of the group or frame number.

The processor 204 is further coupled to a read-only memory (ROM) 208 for non-volatile storage of firmware elements for directing the system controller 102 in accordance with the preferred embodiment of the present invention. It will be appreciated that other forms of non-volatile memory, such as programmable read-only memory (PROM), electrically erasable programmable read-only memory (EEPROM), electrically alterable read-only memory (EAROM), and magnetic disk memory, can be utilized as well for the ROM 208. The firmware elements comprise a rotation element 210 for periodically rotating the predetermined queuing order such that each of the selective call addresses queued in the transmission positions 230 experiences a long-term mean queuing delay that is substantially the same as that of any of the other selective call addresses. Long-term mean queuing delay is herein defined as the average delay between the initiation of each transmission of a queuing group 222, 224, 226, 228 and the transmission of a selective call address queued therein, the average being taken over a substantial number of queuing group transmissions, e.g., one hundred transmissions.

The rotation element 210 comprises first and second queuing elements 212, 216 for queuing first and second pluralities of selective call addresses into first and second pluralities of queuing groups for first and second transmissions, wherein the first and second pluralities of selective call addresses preferably are queued in first and second predetermined queuing orders that are the reverse of one another. The first and second queuing elements 212, 216 preferably comprise ascender and descender elements 214, 218 for constraining the first and second pluralities of selective call addresses to be transmitted in ascending and descending order, respectively.

For example, if selective call addresses having the values three, ten, and two are queued in the first plurality of queuing groups, the transmission order will be two, three, ten. If the same three addresses are queued in the second plurality of queuing groups, the transmission order will be ten, three, two. Because, over time, the addresses are randomly placed into either the first or second plurality of queuing groups, the rotation of the queuing order in accordance with the preferred embodiment of the present invention advantageously equalizes the long-term mean queuing delay. Averaged over a plurality of queuing group transmissions, the queuing delay for each selective call address approaches a single, constant value substantially equal to one-half the time required to transmit a single queuing group, thus equalizing the battery life of the selective call receivers 110.

Alternatively, the rotation element 210 can utilize a starter element 220 for designating a rotating starting point for the predetermined queuing order, from which the transmission positions are queued in a predetermined order until all the transmission positions have been queued. For example, a first queuing group can queue the addresses in the order one through ten; a second queuing group, two through ten followed by one; a third group, three through ten followed by one through two; a fourth group, four through ten followed by one through three; and so on until each of the addresses has served as the starting address.

Rotating the starting point for the queuing order advantageously equalizes the long-term mean queuing delays for the selective call addresses queued in the queuing groups, while obviating the requirement for alternating the direction of the queuing order. That is, rotation of the starting point allows one to utilize a fixed queuing direction within each contiguous range of addresses, e.g., ascending order from the starting point through the highest address followed by ascending order again from the lowest address through the address just below the starting point.

It will be appreciated that other similar queuing orders can be utilized, the objective being to rotate either the direction or the starting point of the queuing order, or both, such that over time, each of the selective call addresses queued in the transmission positions 230 experiences substantially the same long-term mean queuing delay as any other address.

The processor 204 is also coupled to an encoder/transmitter controller 206 for interfacing with the transmitter 108 over one of the telephone lines 106 for transmitting pages and messages to the selective call receivers 110. The hardware elements of the system controller 102 are conventional and preferably are similar to the hardware elements of the model E09PED0552 Page-Bridge ® paging terminal manufactured by Motorola, Inc. of Schaumburg, Ill. The firmware elements 210, 212, 214, 216, 218, 220 and the organization and utilization of the RAM 232 within the system controller 102 comprise new elements in accordance with the preferred embodiment of the present invention.

Figure 3:
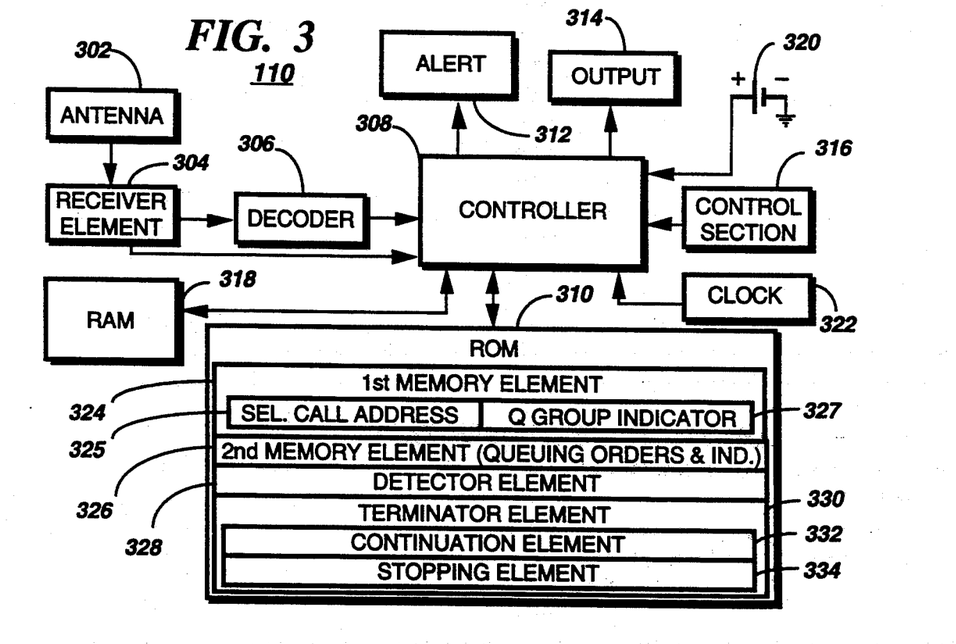
FIG. 3 is an electrical block diagram of a battery-powered selective call receiver in accordance with the preferred embodiment of the present invention.

Referring to FIG. 3, an electrical block diagram of the battery-powered selective call receiver 110 in accordance with the preferred embodiment of the present invention comprises an antenna 302 for intercepting RF signals. The antenna 302 is coupled to a receiver element 304 for receiving and demodulating the RF signals intercepted. A decoder 306 is coupled to the receiver element 304 for decoding a demodulated address transmitted in any of a number of well-known signaling protocols, such as the European Radio Message System (ERMES) or FLEX ® selective call signaling protocols. (FLEX is a trademark of Motorola, Inc.)

A controller 308, e.g., the MC68HC05, C08, or C11 series microcomputers manufactured by Motorola, Inc. of Schaumburg, Ill., is also coupled to the receiver element 304 for processing the demodulated information. The controller 308 is responsive to the decoder 306 and is coupled to a random access memory (RAM) 318 for storing operating variables and recovered information having an address assigned to the selective call receiver 110. An alert generator 312 is coupled to the controller 308 for providing an audible or tactile alert to a user when the controller 308 has a received message ready for presentation.

An output device 314 comprises a visual display or an audio transducer or both, the output device 314 also being controlled by the controller 308. A control section 316 comprises user accessible controls for allowing the user to command the controller 308 to perform the selective call receiver operations well known to one of ordinary skill in the art, and typically includes control switches such as an on/off control button, a function control, etc. A conventional clock element 322 is coupled to the controller 308 for providing timing signals thereto, while a battery 320 is also coupled to the controller 308 for providing power to the controller 308 and other elements of the selective call receiver 110.

The controller 308 is also coupled to a read-only memory (ROM) 310 comprising firmware elements for controlling the selective call receiver 110 in accordance with the preferred embodiment of the present invention. The firmware elements comprise a first memory element 324 comprising a pre-programmed individual selective call address 325 to which the selective call receiver 110 is responsive, and further comprising a pre-programmed queuing group indicator 327 for indicating membership of the selective call receiver 110 in a particular queuing group. It will be appreciated that the queuing group indicator 327 can be an inherent part of the selective call address 325 or can be determined from a group or frame number (or portion thereof) inherent in the selective call signaling protocol, as well.

The firmware elements further comprise a second memory element 326 including pre-programmed information defining the predetermined queuing orders utilized by the communication system 100, along with the queuing order indicator 229 associated with each of the predetermined queuing orders. For example, in a system utilizing alternating ascending and descending queuing orders, a value of one could be assigned to the queuing order indicator 229 for ascending order, while a value of two could be assigned for descending order.

The firmware elements further comprise a detector element 328 for detecting that initiation of a transmission of a particular queuing group matching the queuing group indicator 327 pre-programmed into the first memory element 324 is imminent. This can be accomplished in a synchronous system, for example, by establishing synchronization between the selective call receiver 110 and communication signals from the system controller 102 in a manner well known in the art. After establishing synchronization, the controller 308 can monitor the clock element 322 to determine that the time predetermined for transmission of the queuing group matching the pre-programmed queuing group indicator 327 is at hand.

The firmware elements also include a terminator element 330 for ending reception and decoding of a particular queuing group in response to receiving a selective call address, wherein the predetermined queuing order constrains the received selective call address to be received after any address matching the individual selective call address 325 pre-programmed into the first memory element 324. The terminator element comprises a continuation element 332 and a stopping element 334.

When the transmitted queuing order is the ascending order, the continuation element 332 instructs the controller 308 to continue reception and decoding of the particular queuing group in response to determining that a received selective call address is not greater than the individual selective call address 325 pre-programmed into the first memory element 324. When the selected queuing order is the ascending order, the stopping element 334 instructs the controller 308 to stop reception and decoding of the particular queuing group in response to determining that a received selective call address is greater than the individual selective call address 325 pre-programmed into the first memory element 324.

When the transmitted queuing order is the descending order, the continuation element 332 instructs the controller 308 to continue reception and decoding of the particular queuing group in response to determining that a received selective call address is not less than the individual selective call address 325 pre-programmed into the first memory element 324. When the selected queuing order is the descending order, the stopping element 334 instructs the controller 308 to stop reception and decoding of the particular queuing group in response to determining that a received selective call address is less than the individual selective call address 325 pre-programmed into the first memory element 324.

It will be appreciated that the functions of the decoder 306, the RAM 318, and the ROM 310 may be incorporated into the controller 308 as well, as contiguous components thereof. It will be further appreciated that other types of non-volatile memory, e.g., programmable read-only memory (PROM), electrically alterable read-only memory (EAROM), and electrically-erasable programmable read-only memory (EEPROM), may be used as well for the ROM 310.

Figure 4:
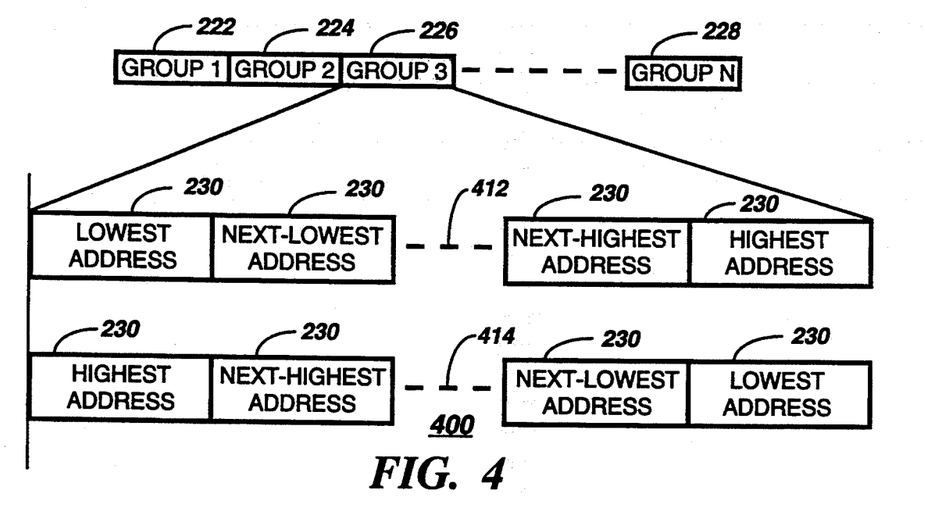
FIG. 4 is a signaling diagram in accordance with the preferred embodiment of the present invention.

Referring to FIG. 4, a signaling diagram 400 in accordance with the preferred embodiment of the present invention depicts the structure of a plurality of the queuing groups 222, 224, 226, 228. Each of the queuing groups 222, 224, 226, 228 comprises the transmission positions 230 queued with selective call addresses in a predetermined order. For simplicity, the queuing order indicator 229 is not depicted in the signaling diagram 400.

In a first transmission 412 of one of the queuing groups 222, 224, 226, 228, the selective call addresses preferably are queued into the transmission positions 230 in ascending order, i.e., proceeding from the lowest address to the highest. In a second transmission 414 of one of the queuing groups 222, 224, 226, 228, the selective call addresses preferably are queued into the transmission positions 230 in descending order, i.e., proceeding from the highest address to the lowest. By rotating the queuing order as depicted in the signaling diagram 400, each of the selective call addresses will experience substantially the same long-term mean queuing delay as any other selective call address, thereby advantageously equalizing battery drain over time in the selective call receivers awaiting pages in their respective queuing groups 222, 224, 226, 228.

Figure 5:
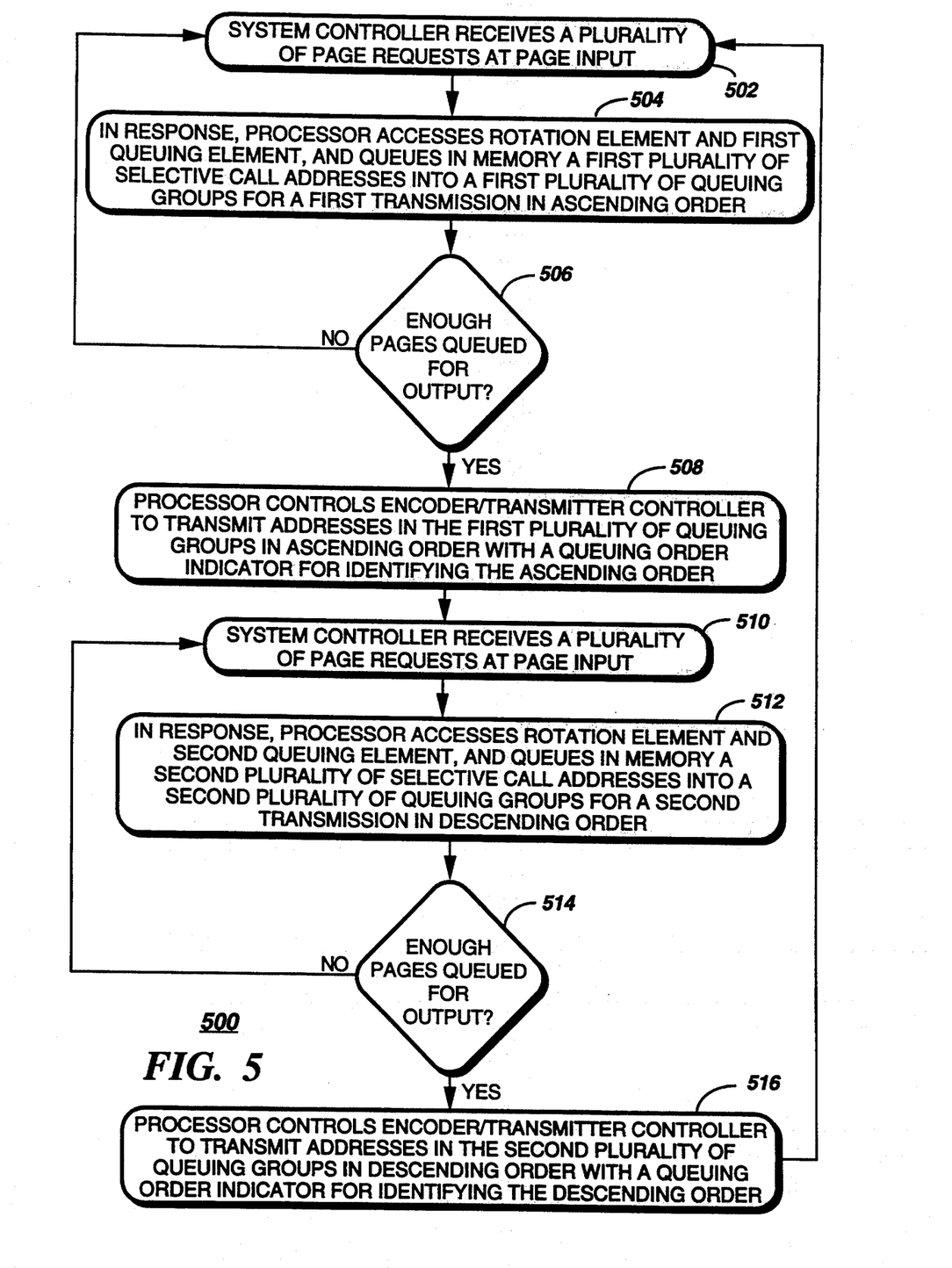
FIG. 5 is a flow chart depicting the operation of the system controller in accordance with the preferred embodiment of the present invention.

Referring to FIG. 5, a flow chart 500 depicting the operation of the system controller 102 in accordance with the preferred embodiment of the present invention begins with the system controller 102 receiving 502 a plurality of page requests at the page input 104. In response, the processor 204 accesses 504 the rotation element 210 and the first queuing element 212, and queues in the RAM 232 a first plurality of selective call addresses into a first plurality of the queuing groups 222, 224, 226, 228 for a first transmission in ascending order.

Next, the processor 204 checks 506 to determine whether enough pages have been queued for output in accordance with the specific protocol being utilized. If not, the processor 204 returns to step 502 to await more page requests. If, however, enough pages have been queued, the processor 204 controls 508 the encoder/transmitter controller 206 to transmit the addresses in the first plurality of the queuing groups 222, 224, 226, 228 in ascending order, along with the queuing order indicator 229 for indicating the utilization of ascending queuing order.

Next, the system controller 204 receives 510 another plurality of page requests at the page input 104. In response, the processor 204 accesses 512 the rotation element 210 and the second queuing element 216, and queues in the RAM 232 a second plurality of selective call addresses into a second plurality of the queuing groups 222, 224, 226, 228 for a second transmission in descending order. Then the processor 204 checks 514 to determine whether enough pages have been queued for output in accordance with the specific protocol being utilized. If not, the processor 204 returns to step 510 to await more page requests. If, however, enough pages have been queued, the processor 204 controls 516 the encoder/transmitter controller 206 to transmit the addresses in the second plurality of the queuing groups 222, 224, 226, 228 in descending order, along with the queuing order indicator 229 for indicating the utilization of the descending queuing order. Then the processor 204 returns to step 502 to await more page requests.

Figure 6:
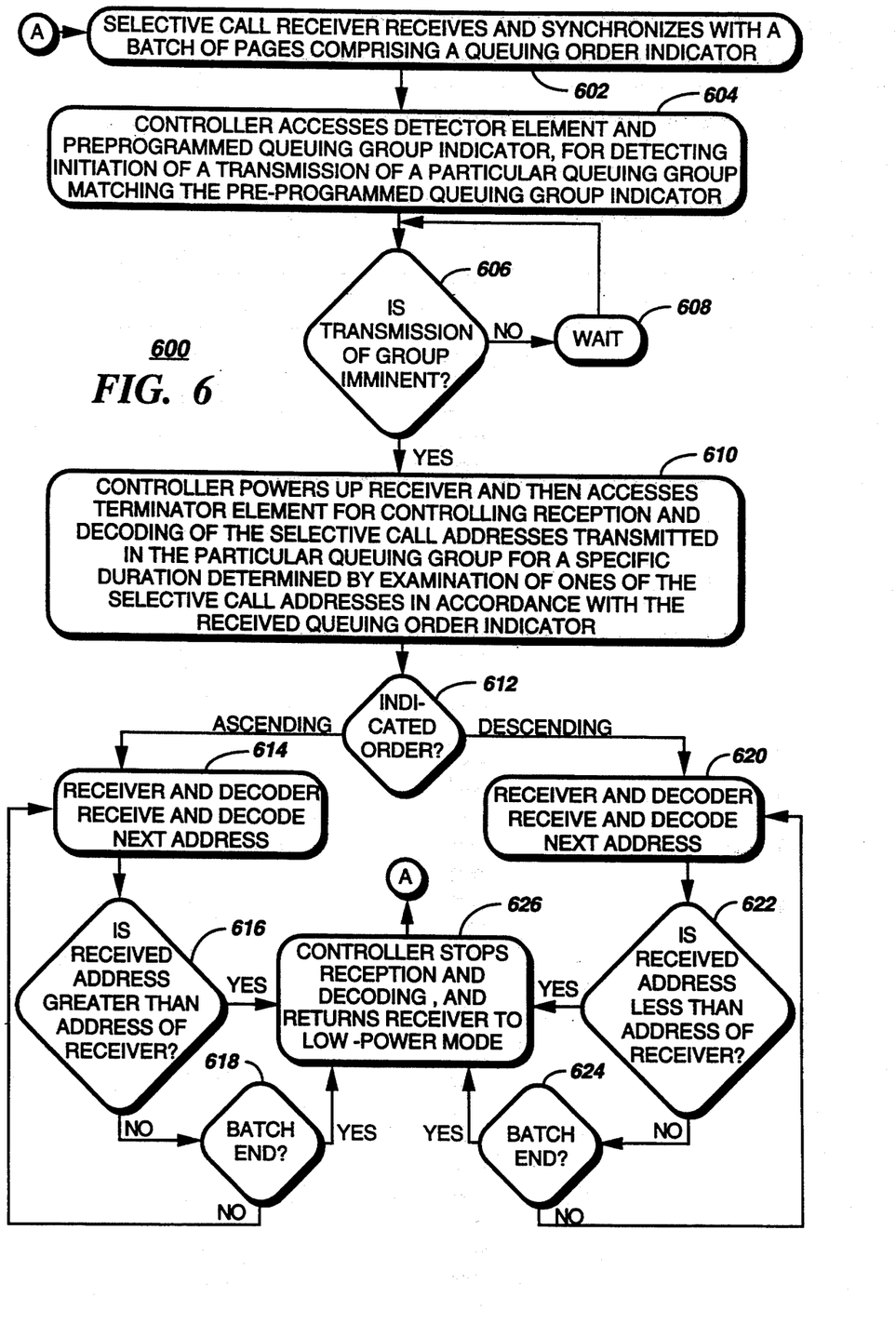
FIG. 6 is a flow chart depicting the operation of the battery-powered selective call receiver in accordance with the preferred embodiment of the present invention.

Referring to FIG. 6, a flow chart 600 depicting the operation of the battery-powered selective call receiver 110 in accordance with the preferred embodiment of the present invention begins with 602 the receipt of and synchronization with a batch of pages comprising the queuing order indicator 229. In response, the controller 308 accesses 604 the detector element 328 and the pre-programmed queuing group indicator 327, for detecting initiation of a transmission of a particular queuing group matching the pre-programmed queuing group indicator 327. Next, the controller 308 checks 606 to determine whether transmission of the particular queuing group is imminent. If not, the controller 308 waits 608 for the time of the transmission to arrive.

When the time arrives, the controller 308 powers up 610 the circuit elements of the selective call receiver 110 and then accesses the terminator element 330 for controlling reception and decoding of the selective call addresses transmitted in the particular queuing group for a specific duration determined by examination of ones of the selective call addresses in accordance with the received queuing order indicator 229. Next, the controller 308 checks 612 to determine whether the received queuing order indicator 229 indicates ascending or descending order.

If in step 612 the indicated order is determined to be ascending, the controller 308 controls the receiver element 304 and the decoder 306 to receive and decode 614 a next selective call address. The controller 308 then accesses the continuation element 332 and the stopping element 334 to determine 616 whether the received address is greater than the selective call address 325 of the receiver 110. If not, the continuation element allows continuation to proceed to step 618 to check for the end of the batch of pages. If the batch has ended, then the flow moves to step 626, where the controller 308 controls the receiver element 304 and the decoder 306 to stop reception and decoding, and to return to a low-power, battery saving mode. If, on the other hand, in step 618 the batch has not ended, the controller 308 then returns to step 614 to receive and decode the next address. Alternatively, if in step 616 the received address is greater than the selective call address 325 of the receiver 110, the controller 308 then moves directly to step 626, where the controller 308 controls the receiver element 304 and the decoder 306 to stop reception and decoding, and to return to the low-power, battery saving mode, after which the flow returns to step 602 to receive a next batch of pages.

If, on the other hand, in step 612 the indicated order is determined to be descending, the controller 308 controls the receiver element 304 and the decoder 306 to receive and decode 620 a next selective call address. The controller 308 then accesses the continuation element 332 and the stopping element 334 to determine 622 whether the received address is less than the selective call address 325 of the receiver 110. If not, the continuation element allows continuation to proceed to step 624 to check for the end of the batch of pages. If the batch has ended, then the flow moves to step 626, where the controller 308 controls the receiver element 304 and the decoder 306 to stop reception and decoding, and to return to a low-power, battery saving mode. If, on the other hand, in step 624 the batch has not ended, the controller 308 then returns to step 620 to receive and decode the next address. Alternatively, if in step 622 the received address is less than the selective call address 325 of the receiver 110, the controller 308 then moves directly to step 626, where the controller 308 controls the receiver element 304 and the decoder 306 to stop reception and decoding, and to return to the low-power, battery saving mode, after which the flow returns to step 602 to receive a next batch of pages.

Figure 7:
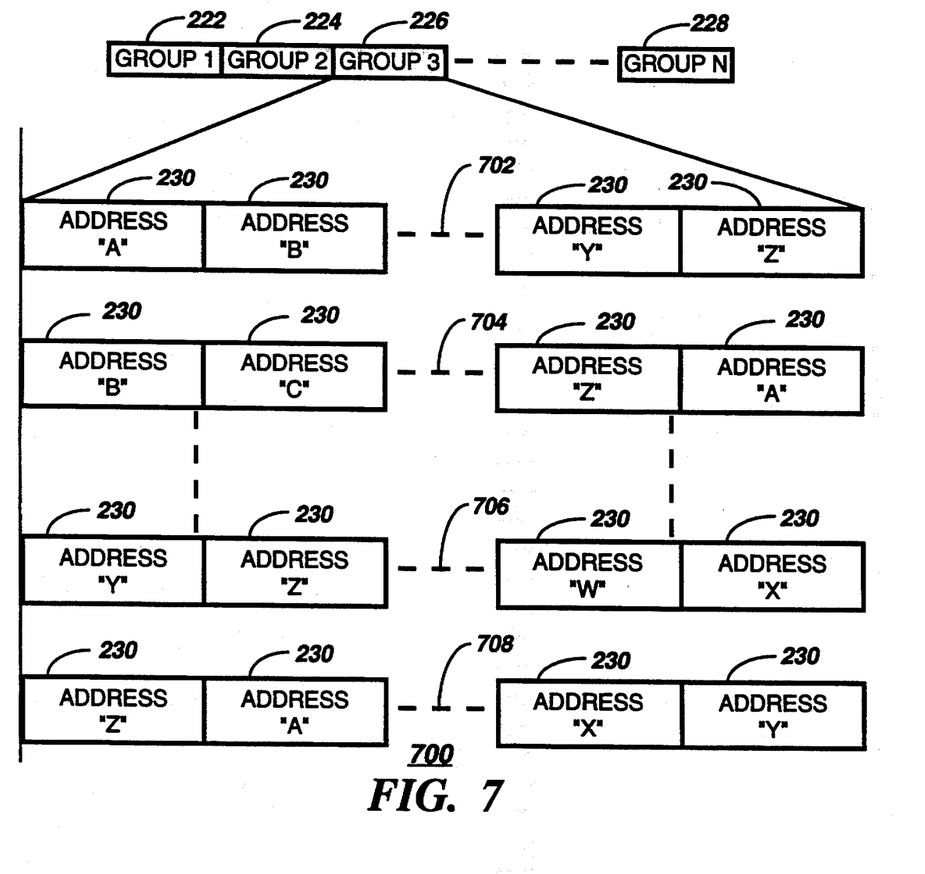
FIG. 7 is a signaling diagram in accordance with an alternative embodiment of the present invention.

Referring to FIG. 7, a signaling diagram 700 depicting the structure of one of the queuing groups 222, 224, 226, 228 in accordance with an alternative embodiment of the present invention comprises the transmission positions 230. For simplicity, the queuing order indicator 229 is not depicted in the signaling diagram 700.

In the signaling diagram 700 the addresses are queued in a constant order within contiguous segments of each queuing group 222, 224, 226, 228, while the starting point of the queue varies from one transmission to the next. In a first transmission 702 the queuing order runs from address "A" through address "Z", for example. In a second transmission 704 the queuing order runs from address "B" through address "Z" followed by address "A". The transmissions continue with a rotating starting point until in a next-to-last transmission 706 the queuing order runs from address "Y" through address "Z" followed by address "A" through address "X". In a last transmission 708 of a complete cycle the queuing order runs from address "Z" followed by address "A" through address "Y". By maintaining a constant queuing direction within each contiguous segment of the queue, e.g., ascending order, while rotating the starting point of the queue, each address has an equal opportunity of being transmitted early or late in the queuing order, thereby advantageously equalizing the long-term mean queuing delay and thus equalizing the battery life of the selective call receivers 110.

It will be appreciated that other similar queuing order rotations can be utilized, the objective being to rotate either the direction or the starting point of the queuing order, or both, such that over time, each of the selective call addresses queued in the transmission positions 230 of the queuing groups 222, 224, 226, 228 experiences substantially the same long-term mean queuing delay as any other of the selective call addresses.

Thus, the present invention provides a method and apparatus that advantageously equalizes battery life among battery-powered selective call receivers in a communication system utilizing periodic transmissions of queuing groups of selective call addresses queued into the queuing groups for battery saving, and further queued into transmission positions having a predetermined queuing order within the queuing groups. The method and apparatus advantageously achieves battery saving benefits comparable to those that could be achieved by consistently returning every receiver to the low-power mode substantially halfway through the transmission of the queuing group to which the receiver belongs.

What is claimed is:

1. A method of equalizing battery life among a plurality of battery-powered selective call receivers in a communication system utilizing periodic transmissions of selective call addresses queued into queuing groups for battery saving, and further queued into transmission positions having a predetermined queuing order within the queuing groups for additional battery saving, the method comprising the steps of:

periodically changing, in a system controller, the predetermined queuing order, comprising the steps of:

queuing a first plurality of selective call addresses into a first plurality of queuing groups for a first transmission, wherein the first plurality of selective call addresses are queued in a first predetermined queuing order;

queuing a second plurality of selective call addresses into a second plurality of queuing groups for a second transmission, wherein the second plurality of selective call addresses are a queued in a second predetermined queuing order substantially equal to the first predetermined queuing order in reverse; and alternately transmitting to the plurality of battery-powered selective call receivers the first plurality of queuing groups and a first queuing order indicator for identifying the first predetermined queuing order, followed by the second plurality of queuing groups and a second queuing order indicator for identifying the second predetermined queuing order, wherein at least one of the plurality of battery-powered selective call receivers is pre-programmed with an individual selective call address comprising a queuing group indicator for indicating membership in a particular queuing group, and further is pre-programmed with information defining predetermined queuing orders utilized by the communication system, and wherein the method further comprises in a receiver of the at least one of the plurality Of battery-powered selective call receivers the steps of:

receiving a queuing order indicator for indicating one of the predetermined queuing orders utilized for a corresponding transmission of a queuing group;

detecting that the initiation of a transmission of the particular queuing group matching the queuing group indicator pre-programmed into the receiver is imminent; and controlling reception and decoding of the selective call addresses transmitted in the particular queuing group for a specific duration in response to the detecting step, wherein the specific duration is determined by examination of ones of the selective call addresses in accordance with the received queuing order indicator.

2. The method according to claim 1, wherein the controlling step comprises the step of ending reception and decoding of the particular queuing group in response to receiving a selective call address, wherein the predetermined queuing order constrains the received selective call address to be received after any address matching the individual selective call address pre-programmed into the receiver.

3. The method according to claim 2, wherein the predetermined queuing order constrains the selective call addresses to be sent in ascending order, and wherein the ending step comprises the steps of:

continuing reception and decoding of the particular queuing group in response to determining that a received selective call address is not greater than the individual selective call address pre-programmed into the receiver; and stopping reception and decoding of the particular queuing group in response to determining that a received selective call address is greater than the individual selective call address pre-programmed into the receiver.

4. The method according to claim 2, wherein the predetermined queuing order constrains the selective call addresses to be sent in descending order, and wherein the ending step comprises the steps of:

continuing reception and decoding of the particular queuing group in response to determining that a received selective call address is not less than the individual selective call address pre-programmed into the receiver; and stopping reception and decoding of the particular queuing group in response to determining that a received selective call address is less than the individual selective call address pre-programmed into the receiver.

5. Apparatus for equalizing battery life among a plurality of battery-powered selective call receivers in a communication system having a system controller utilizing periodic transmissions of selective call addresses queued into queuing groups for battery saving, and further queued into transmission positions having a predetermined queuing order within the queuing groups for additional battery saving, the apparatus comprising:

rotation means in the system controller for periodically changing the predetermined queuing order, the rotation means comprising:

first queuing means for queuing a first plurality of selective call addresses into a first plurality of queuing groups for a first transmission, wherein the first plurality of selective call addresses are queued in a first predetermined queuing order; and second queuing means coupled to the first queuing means for queuing a second plurality of selective call addresses into a second plurality of queuing groups for a second transmission, wherein the second plurality of selective call addresses are queued in a second predetermined queuing order substantially equal to the first predetermined queuing order in reverse, and wherein the apparatus further comprises transmitter means coupled to the first and second queuing means for alternately transmitting to the plurality of battery-powered selective call receivers the first plurality of queuing groups and a first queuing order indicator for identifying the first predetermined queuing order, followed by the second plurality of queuing groups and a second queuing order indicator for identifying the second predetermined queuing order, wherein at least one of the plurality of battery-powered selective call receivers is pre-programmed with an individual selective call address comprising a queuing group indicator for indicating membership in a particular queuing group, and further is pre-programmed with information defining predetermined queuing orders utilized by the communication system, and wherein the apparatus further comprises in the at least one of the plurality of battery-powered selective call receivers:

receiver means coupled by radio to the transmitter means for receiving a queuing order indicator for indicating the predetermined queuing order utilized for a corresponding transmission of a queuing group;

detector means coupled to the receiver means for detecting that the initiation of a transmission of the particular queuing group matching the queuing group indicator pre-programmed into the battery-powered selective call receiver is imminent; and controller means coupled to the detector means and to the receiver means for controlling reception and decoding of the selective call addresses transmitted in the particular queuing group for a specific duration in response to the initiation of the transmission being imminent, wherein the specific duration is determined by examination of ones of the selective call addresses in accordance with the received queuing order indicator.

6. The apparatus according to claim 5, further comprising terminator means for ending reception and decoding of the particular queuing group in response to receiving a selective call address, wherein the predetermined queuing order constrains the received selective call address to be received after any address matching the individual selective call address pre-programmed into the battery-powered selective call receiver.

7. The apparatus according to claim 6,
wherein the predetermined queuing order constrains the selective call addresses to be sent in ascending order, and
wherein the terminator means comprises:
continuation means for continuing reception and decoding of the particular queuing group in response to determining that a received selective call address is not greater than the individual selective call address pre-programmed into the battery-powered selective call receiver; and
stopping means coupled to the continuation means for stopping reception and decoding of the particular queuing group in response to determining that a received selective call address is greater than the individual selective call address pre-programmed into the battery-powered selective call receiver.

8. The apparatus according to claim 6,
wherein the predetermined queuing order constrains the selective call addresses to be sent in descending order, and
wherein the terminator means comprises:
continuation means for continuing reception and decoding of the particular queuing group in response to determining that a received selective call address is not less than the individual selective call address pre-programmed into the battery-powered selective call receiver; and
stopping means coupled to the continuation means for stopping reception and decoding of the particular queuing group in response to determining that a received selective call address is less than the individual selective call address pre-programmed into the battery-powered selective call receiver.

9. A system controller for equalizing battery life among a plurality of battery-powered selective call receivers in a communication system including a transmitter and utilizing periodic transmissions of selective call addresses queued into queuing groups for battery saving, and further queued into transmission positions having a predetermined queuing order within the queuing groups for additional battery saving, the system controller comprising:
a page input for receiving page requests from callers wishing to page one of the plurality of battery-powered selective call receivers;
a memory element coupled to the page input for storing the received page requests for subsequent transmission; and
a rotation element for periodically changing the predetermined queuing order, the rotation element comprising:
a first queuing element for queuing a first plurality of selective call addresses into a first plurality of queuing groups for a first transmission, wherein the first plurality of selective call addresses are queued in a first predetermined queuing order; and
a second queuing element coupled to the first queuing element for queuing a second plurality of selective call addresses into a second plurality of queuing groups for a second transmission, wherein the second plurality of selective call addresses are queued in a second predetermined queuing order substantially equal to the first predetermined queuing order in reverse, and
wherein the system controller further comprises an encoder/transmitter controller coupled to the first and second queuing elements and to the transmitter for controlling the transmitter to alternately transmit to the plurality of battery-powered selective call receivers the first plurality of queuing groups and a first queuing order indicator for identifying the first predetermined queuing order, followed by the second plurality of queuing groups and a second queuing order indicator for identifying the second predetermined queuing order.

10. The system controller according to claim 9,
wherein the first queuing element comprises an ascender element for constraining the first plurality of selective call addresses to be transmitted in ascending order, and
wherein the second queuing element comprises a descender element for constraining the second plurality of selective call addresses to be transmitted in descending order.

11. A battery-powered selective call receiver for equalizing battery life among a plurality of the battery-powered selective call receivers in a communication system utilizing periodic transmissions of selective call addresses from a transmitter, the selective call addresses queued into queuing groups for battery saving, and further queued into transmission positions having a predetermined queuing order within the queuing groups for additional battery saving, the battery-powered selective call receiver comprising:
a first memory element having pre-programmed therein an individual selective call address for identifying the battery-powered selective call receiver, and a queuing group indicator for indicating membership in a particular queuing group;
a second memory element coupled to the first memory element and pre-programmed with information defining predetermined queuing orders utilized by the communication system;
a receiver element coupled to the transmitter for receiving a queuing order indicator for indicating the predetermined queuing order utilized for a corresponding transmission of a queuing group;
a detector element coupled to the receiver element and to the first memory element for detecting that the initiation of a transmission of a particular queuing group matching the queuing group indicator pre-programmed into the first memory element is imminent; and
a controller coupled to the detector element and to the receiver element for controlling reception and decoding of the selective call addresses transmitted in the particular queuing group for a specific duration in response to the initiation of the transmission being imminent, wherein the specific duration is determined by examination of ones of the selective call addresses in accordance with the received queuing order indicator.

12. The battery-powered selective call receiver according to claim 11, further comprising a terminator element for ending reception and decoding of the particular queuing group in response to receiving a selective call address, wherein the predetermined queuing order constrains the received selective call address to be received after any address matching the individual selective call address pre-programmed into the first memory element.

13. The battery-powered selective call receiver according to claim 12,
wherein the predetermined queuing order constrains the selective call addresses to be sent in ascending order, and
wherein the terminator element comprises:
a continuation element for continuing reception and decoding of the particular queuing group in response to determining that a received selective call address is not greater than the individual selective call address pre-programmed into the first memory element; and
a stopping element coupled to the continuation element for stopping reception and decoding of the particular queuing group in response to determining that a received selective call address is greater than the individual selective call address pre-programmed into the first memory element.

14. The battery-powered selective call receiver according to claim 12,
wherein the predetermined queuing order constrains the selective call addresses to be sent in descending order, and
wherein the terminator element comprises:
a continuation element for continuing reception and decoding of the particular queuing group in response to determining that a received selective call address is not less than the individual selective call address pre-programmed into the first memory element; and
a stopping element coupled to the continuation element for stopping reception and decoding of the particular queuing group in response to determining that a received selective call address is less than the individual selective call address pre-programmed into the first memory element.

15. A system controller for equalizing battery life among a plurality of battery-powered selective call receivers in a communication system including a transmitter and utilizing periodic transmissions of selective call addresses queued into queuing groups for battery saving, and further queued into transmission positions having a predetermined queuing order within the queuing groups for additional battery saving, the system controller comprising:
a page input for receiving page requests from callers wishing to page one of the plurality of battery-powered selective call receivers;
a memory element coupled to the page input for storing the received page requests for subsequent transmission; and
a rotation element for periodically changing the predetermined queuing order such that each of the selective call addresses experiences a queuing delay between an initiation of a transmission of a queuing group and a transmission of the selective call address queued in the queuing group,
wherein the queuing delay averaged over a plurality of queuing group transmissions approaches a single, constant value substantially applicable to each of the selective call addresses, and
wherein the rotation element comprises a starter element for designating a rotating starting point for the predetermined queuing order, from which the selective call addresses are queued in a predetermined order until all the selective call addresses have been queued.

* * * * *